United States Patent

[11] 3,629,505

[72] Inventors Leo Eduard Zegers;
Wilfred Andre Maria Snijders; Kuilman Jan, all of Emmasingel, Eindhoven, Netherlands

[21] Appl. No. 795,109
[22] Filed Jan. 29, 1969
[45] Patented Dec. 21, 1971
[73] Assignee U.S. Philips Corporation New York, N.Y.
[32] Priority Feb. 1, 1968
[33] Netherlands
[31] 6801502

[54] TRANSMISSION SYSTEM FOR THE TRANSMISSION OF INFORMATION IN A PRESCRIBED FREQUENCY BAND

4 Claims, 2 Drawing Figs.

[52] U.S. Cl. 178/69.5 R, 325/30, 325/50, 325/55
[51] Int. Cl. H04j 3/06
[50] Field of Search 179/2, 5.1; 325/30, 39, 50, 55; 178/66, 68, 69.5 R

[56] References Cited

UNITED STATES PATENTS

| | | | |
|---|---|---|---|
| 3,390,232 | 6/1968 | De Jager et al. | 178/69.5 |
| 3,067,280 | 12/1962 | Schlafly, Jr. | 179/5.1 |
| 3,069,657 | 12/1962 | Green, Jr. et al. | 325/30 |
| 3,142,723 | 7/1964 | Fleming | 325/30 |
| 3,406,344 | 10/1968 | Hopper | 325/50 |

*Primary Examiner*—Richard Murray
*Assistant Examiner*—P. M. Pecori
*Attorney*—Frank R. Trifari

ABSTRACT: A transmission system where at the transmitter a source of information pulses is mixed with frequency modulated pseudorandom pulses, which can serve as synchronization, address signals, etc. At the receiver, the pseudorandom signals are frequency demodulated and used to synchronize a local pulse generator. Then they are frequency modulated and subtracted from the received signal.

INVENTORS
LEO E. ZEGERS
WILFRED A.M. SNIJDERS
BY JAN KUILMAN
AGENT

TRANSMISSION SYSTEM FOR THE TRANSMISSION OF INFORMATION IN A PRESCRIBED FREQUENCY BAND

A prior application U.S. Pat. Ser. No. 663,783 filed Aug. 28, 1967 now abandoned in favor of U.S. Pat. Ser. No. 64,121, filed July 30, 1970, relates to a transmission system comprising a transmitter and a receiver for the transmission of information in a prescribed frequency band, the overall information to be transmitted originating from a main information source and an associated auxiliary information source having a smaller information content than the main information source. The transmission of the information signals may be affected directly or after modulation, for example, amplitude modulation or frequency modulation.

In this transmission system the auxiliary information signal is formed by a periodic pulse pattern located within the frequency band of the main information signal and uncorrelated with the main information signal which pattern originates from the auxiliary information source constructed as a pulse pattern generator, said pulse pattern in the transmitter being combined with the main information signal in a linear combination device without frequency separation and without time separation, while in the receiver the main information signal and the pulse pattern located within the frequency band thereof and combined linearly therewith are applied in common to a modulation device to which also the locally obtained pulse pattern is applied which originates from a local pulse pattern generator corresponding to the pulse pattern generator in the transmitter, the output of the modulation device being connected to a smoothing filter which for automatic phase correction is connected to a frequency-determining member of the local pulse pattern generator.

It is an object of the invention to provide a transmission system of the type described in which the accurate transmission of the auxiliary information signal is also ensured when transmitting the information signals through transmission paths in which the information signals are subject to irregularly changing frequency shifts.

According to the invention the transmission system is characterized in that the pulse pattern generator in the transmitter is connected to the input of a frequency modulator the output of which is connected to the linear combination device, while in the receiver the received information signals are applied to the modulation device through a frequency demodulator.

In order that the invention may be readily carried into effect it will now be described in detail, by way of example, with reference to the accompanying diagrammatic drawing, in which:

FIG. 1 shows a transmission system according to the invention, while

Figure 1:
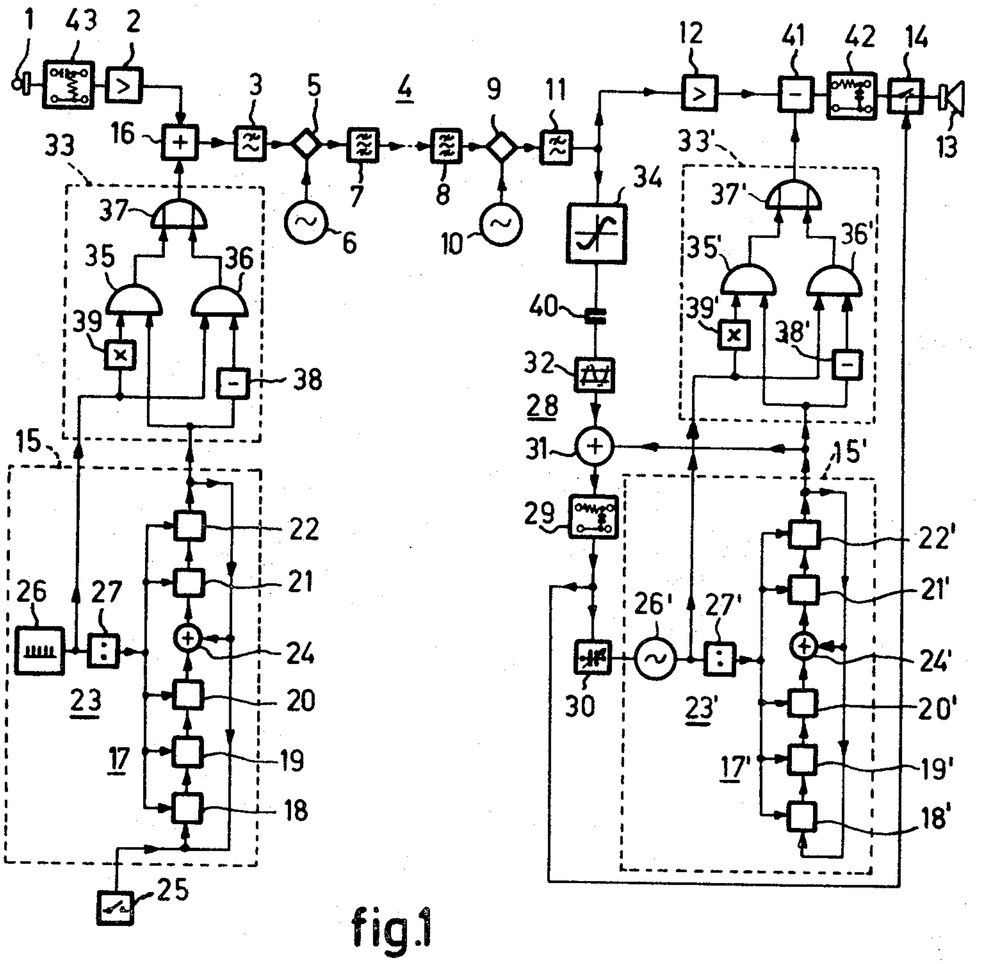

FIG. 1 shows a transmission system according to the invention having a transmitter and a receiver for the transmission of a speech signal to which a frequency band having a width of 3.5 kc./s. is allotted. The transmission is effected while using single sideband amplitude modulation. To this end the speech signal originating from the microphone 1 is passed on to a transmission path 4 in the transmitter after amplification in an amplifier 2 and through a low-pass filter 3 having a cutoff frequency of 3.5 kc./s. An amplitude modulator 5 fed by a carrier oscillator 6 of 64 kc./s. and provided with a single sideband filter 7 having a passband of 64.0–67.5 kc./s. is connected to the input end of this transmission path 4, while a selection filter 8 likewise having a passband of 64.0–67.5 kc./s. is provided at the output end of this transmission path 4, said filter being connected to an amplitude demodulator 9 fed by a carrier oscillator 10 of 64 kc./s. and provided with a single sideband filter 11 in the form of a low-pass filter having a cutoff frequency of 3.5 kc./s. The speech signal transmitted through this transmission path 4 to the receiver is applied to a reproducing device 13 after amplification in an amplifier 12.

In this transmission system not only the speech signal but also and address signal is transmitted in order to establish a connection between the transmitter and the receiver characterized by certain address, which receiver connects the reproducing device 13 to the amplifier 12 by means of a switch 14 only when receiving its own address. The overall information to be transmitted thus consists of the speech signal originating from a main information source in the form of a microphone 1 and of the address signal originating from an auxiliary information source in the form of an address generator, the information content of the address signal being much smaller than that of the speech signal.

In order to obtain in the transmission system described a particularly efficient transmission of information in accordance with said prior application, the auxiliary information signal serving as an address signal is constituted by a periodic pulse pattern located within the frequency band of 3.5 kc./s. alloted to the speech signal and uncorrelated with the speech signal, which pattern originates from the address generator constructed as a pulse pattern generator 15 and which pattern is combined in the transmitter with the speech signal in a linear combination device 16 without frequency separation and without time separation.

Figure 2:
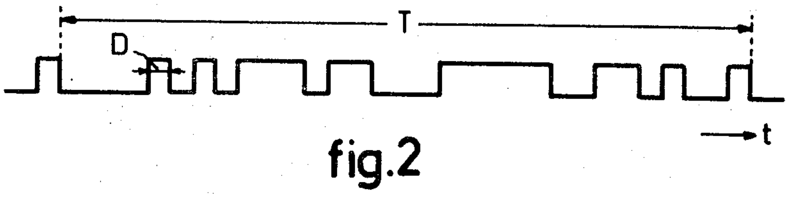
FIG. 2 shows a time diagram to explain the transmission system of FIG. 1.

In the embodiment shown in FIG. 1 the pulse pattern generator 15 is constructed as a feedback shift register 17 having a number of shift register elements 18, 19, 20, 21, 22 the contents of which are shifted by a shift pulse generator 23 with a constant shift period T and with a modulo-2 adder 24 incorporated between the shift register elements 20 and 21, the output of the shift register 17 being connected on the one hand to the second input of the modulo-2 adder 24, and on the other hand to the input of the shift register 17 to which also a starting pulse source 25 is connected. The shift pulse generator 23 is formed by a central clock pulse generator 26 of 1.2 kc./s. to which a frequency divider 27 having a division factor of two is connected which thus produces shift pulses having a shift period D of 1.67 msec. When, in switching on the pulse pattern generator 15, the starting pulse source 25 produces a starting pulse, the shift register 17 will start generating a series of pulses as a result of the feedback coupling, said pulse series having recurrence period T which as explained in said prior application with the shift register 17 of FIG. 1 has the length of $T=(2^5-1)D=31D$. In the embodiment described the pulse pattern at the output of the shift register 17 has the form as shown in FIG. 2, which pulse pattern in the transmission system described so far is added to the speech signal in the linear combination device 16 without frequency separation and without time separation at a level of, for example, 20 db. below that of the speech signal.

In the receiver the speech signal and the pulse pattern which is located within the frequency band allotted thereto and linearly combined therewith are applied in common to a modulation device 28 to which also the locally obtained pulse pattern is applied originating from a local pulse pattern generator 15′ corresponding to the pulse pattern generator 15 in the transmitter, the output of the modulation device 28 being connected to a smoothing filter 29 which for automatic phase correction is connected to a frequency determining member 30 of the local pulse pattern generator 15′.

In the receiver shown in FIG. 1 the local pulse pattern generator 15′ is constructed in the same manner as the pulse pattern generator 15 in the transmitter, corresponding elements being denoted by the same reference numerals but provided with an index at the receiver end. Furthermore, the modulation device 28 is constituted by a modulo-2 adder 31 preceded by a limiter 32 which converts the received information signals into a bivalent signal. The second input of the modulo-2 adder 31 is connected to the local pulse pattern generator 15′ while the output is connected to a smoothing filter in the form of an integrating network 29 the output voltage of which controls a frequency corrector 30 constructed, for example, as a variable reactance which is connected to an oscillator 26′ serving as a local clock pulse generator. To the modulo-2 adder 31 is applied on the one hand the received information signal consisting of the speech signal and the pulse pattern employed as an address signal and on the other hand the local pulse pattern which corresponds in shape but does not correspond in phase with the pulse pattern generated at the transmitter end.

As is described in detail in said prior application an integrating voltage will be formed at the output of the integrating network 29, which voltage, as a result of the uncorrelated condition of speech signal and pulse pattern, in the case of coincidence of the locally obtained pulse pattern and the pulse pattern generated at the transmitter end assumes a maximum value, and in the case of mutual time shifts of the pulse patterns smaller than D is proportional to said time shifts, but has a constant minimum value for larger mutual time shifts. By applying said integration voltage as a control voltage to the frequency corrector 30 an accurate phase stabilization of the local clock pulse generator 26' at the phase of the pulse pattern generated at the transmitter end is obtained.

The increase of the integration voltage which occurs at the integrating network 29 in the case of coincidence and which in accordance with the foregoing forms an indication of the stabilization of the local clock pulse generator 26' is simultaneously utilized for controlling the switch 14 preceding the reproducing device 13. To this end the integrating network 29 is connected through a threshold circuit to the control circuit of the switch 14. In this manner the connection between transmitter and reproducing device is established exclusively when receiving the address signal characterizing the receiver.

In the transmission system described so far the address signal is thus transmitted in the speech band without frequency separation and without time separation, the speech quality nevertheless being only slightly influenced by the address signal which has a very low level, for example, 20 db. below that of the speech signal.

Difficulties are found to occur in practice in the transmission of the information signals through transmission paths in which the information signals are subject to irregularly changing frequency shifts which, for example, in the case of the single sideband transmission system shown in FIG. 1 may be caused by irregular differences in the carrier frequencies of the carrier oscillators 6 and 10 at the input ends, respectively, of the transmission path 4, which differences may rise to, for example, 100 c./s. in transmission paths of less satisfactory quality. It is particularly found that the transmission of the pulse pattern acting as an address signal is influenced detrimentally by these irregular frequency shifts.

In order to obtain in the transmission system described a reliable transmission of the pulse pattern also through transmission paths in which irregular frequency shifts of the information signals occur, in the transmission system according to the invention, the pulse pattern generator 15 in the transmitter is connected to the input of a frequency modulator 33 the output of which is connected to the linear combination device 16, while the received information signals in the receiver are applied through a frequency demodulator 34 to the modulation device 28.

In the embodiment shown the frequency modulator 33 is formed by two AND-gates 35, 36 the outputs of which are connected through an OR-gate 37 to the linear combination device 16, the pulse pattern originating from the pulse pattern generator 15 being applied to both AND-gates 35, 36 through supply lines one of which is provided with an inverter 38, a first carrier oscillation derived from the central clock pulse generator 26 being applied to one of the AND-gates 35, 36 and a second carrier oscillation likewise derived from the central clock pulse generator 26 being applied to the other AND-gate. Particularly, the first carrier oscillation at a frequency of $f_{c1}$ of, for example, 2.4 kc./s. which is derived from the central clock pulse generator 26 with the aid of a frequency multiplier 39 is applied to AND-gate 35, while the second carrier oscillation at a frequency of $f_{c2}$ of, for example, 1.2 kc./s. is applied to AND-gate 36 to which end the series of clock pulses generated by the central clock pulse generator 26 is directly utilized in this case. The frequency demodulator 34 at the receiver end is formed by, for example, a Foster-Seely discriminator.

In the transmission system according to the invention the pulse pattern acting as an address signal from the pulse pattern generator 15 is transmitted by means of frequency shift keying. Dependent on the presence or absence of a pulse in the bivalent pulse pattern to be transmitted a pulse series having a carrier frequency $f_{c1}$ of 2.4 kc./s. or a pulse series having a carrier frequency $f_{c2}$ of 1.2 kc./s., respectively, is applied to the linear combination device 16 through AND-gate 35 and OR-gate 37 or through AND-gate 36 and OR-gate 37, respectively. The frequency-modulator pulse pattern obtained at the output of the frequency modulator 33 is located within the frequency band of 3.5 kc./s. allotted to the speech signal and is added with level of, for example, 20 db. below that of the speech signal in the linear combination device 16 to the speech signal without frequency separation and without time separation. In the receiver the speech signal and the frequency-modulated pulse pattern which is located withing the frequency band allotted thereto and linearly combined therewith are applied in common to the frequency demodulator 34. The pulse pattern originally generated at the transmitter end and the frequency-demodulated speech signal then appear at the output of said demodulator, which signal likewise as the original speech signal is uncorrelated with the pulse pattern. An accurate phase stabilization of the local clock pulse generator 26' on the phase of the pulse pattern generated at the transmitter end will now also be obtained in the manner as described hereinbefore.

If in the transmission system according to the invention there occur irregularly changing frequency shifts in the transmission path 4, the phase stabilization of the local clock pulse generator 26' on the phase of the pulse pattern generated at the transmitter end is substantially unimpeded by the irregularly changing distortions caused by these frequency shifts. In fact, these irregular frequency shifts of the frequency modulated pulse pattern result in irregular amplitude variations in the demodulated pulse pattern at the output of the frequency demodulator 34 to which variations the described automatic phase-correction circuit in itself is already rather insensitive and which variations are in addition still more attenuated by using the limiter 32 in the modulation device 28. Furthermore, a capacitor 40 preceding the limiter 32 is incorporated to block the direct voltage produced by a constant frequency shift at the output of the frequency demodulator 34. If the steps according to the invention were not used these frequency shifts would give rise to considerable and irregular pulse distortions in the received pulse pattern as a result of mutual phase shifts of the components n the pulse spectrum, so that on the one hand the reliability of the transmitted pulse pattern and hence of the phase stabilization decreases, while on the other hand the margin of interference which is already narrow when transmitting information signals through transmission paths of less satisfactory quality is still further reduced.

By using the steps according to the invention it is achieved that even through transmission paths in which irregularly changing frequency shifts occur a reliable transmission of the address signal is effected without frequency separation and without time separation within the frequency band of the speech signal, while also due to the entirely digital structure of the frequency modulator 33 the influence by the address signal on the speech quality can be reduced considerably.

In fact, the influence on the speech signal which is already small due to the low level of the frequency-modulated pulse pattern can still further be reduced by applying the local pulse pattern in the receiver also to a frequency-modulator 33' which is constructed and controlled in the same manner as the frequency modulator 33 in the transmitter and in which corresponding elements in the Figure are denoted by the same reference numerals, but provided with an index at the receiver end, and by subtracting, in a linear difference producer 41, the locally obtained frequency-modulated pulse pattern from the received information signals, As a result of the full conformity in the digital structure of the frequency modulators 33, 33′ and of the accurate phase stabilization of the local clock pulse generator 26′ on the phase of the pulse pattern generated at the transmitter end, the frequency-modulated pulse patterns occurring at the outputs of the frequency modulators 33, 33′ are always in concordance with each other, both in shape and in phase, so that the power of the address signal still remaining after the difference production is greatly reduced. In addition, the shift of the power of the remaining address signal towards higher frequencies in the frequency spectrum permits of a further reduction while using a deemphasis network 42. A corresponding pre-emphasis network 43 for the speech signal must then be used at the transmitter end.

In the transmission system according to the invention the address signal is thus transmitted in the speech band without frequency separation and without time separation, a reliable transmission of the address signal being effected even for transmission paths which cause irregularly changing frequency shifts of the information signals, while the speech quality is nevertheless substantially uninfluenced by the address signal, for example, the remainder of the address signal at the input of the reproducing device 13 remains 50 to 60 db. below the level of the speech signal.

What is claimed is:

1. A transmission system for the transmission of signals in a predetermined band, comprising a transmitter, a receiver, and a transmission path between said transmitter and receiver, said transmitter comprising a source of information signals, a source of a pulsatory signal having a predetermined periodic pulse pattern that is not correlated with said information signals and an amplitude substantially less than said information signals, a frequency modulator means coupled to said source of pulsatory signals thereby producing frequency-modulated pulsatory signals, means for linearly combining said information signals and said frequency-modulated pulsatory signals to produce an output signal in which said information signals and frequency-modulated pulsatory signals occur simultaneously and without frequency separation, and means applying said output signal to said path; said receiver comprising a source of a local pulsatory signal corresponding to the pulsatory signal produced in said transmitter, means for frequency demodulating said pulsatory signals, a modulo-2 adder, means applying said local pulsatory signal and said demodulated signals received from said path to said modulo-2 adder to produce a control signal, means applying said control signal to said source of local pulsatory signal for synchronizing said local pulsatory signal, an output circuit, and means responsive to the reception of a pulsatory signal corresponding to said local pulsatory signal for applying signals from said path to said output circuit.

2. A system as claimed in claim 1 wherein said frequency modulator comprises first and second AND gates, an OR gate, each of said gates having first and second inputs and an output, sources of first and second frequencies coupled to said first inputs of said AND gates respectively, the outputs of said AND gates being coupled to the inputs of said OR gate respectively, said second input of said first AND gate being coupled to said source of pulsatory signals, an inverter coupled between said source of pulsatory signals and said second input of said second AND gate, and said output of said OR gate being coupled to said combining means.

3. A system as claimed in claim 1 further comprising a capacitor coupled between said demodulator and said modulo-2 adder.

4. A system as claimed in claim 1 wherein said receiver further comprises first and second AND gates, an OR gate, each of said gates having first and second inputs and an output, sources of first and second frequency signals coupled to said first inputs of said AND gates respectively, said local source of pulsatory signals being coupled to said second input of said first AND gate, an inverter coupled between said local source of pulsatory signals and said second input of said second AND gate, said outputs of said AND gates being coupled to said inputs of said OR gate respectively, and means for subtracting the output of said OR gate from said received signal.

* * * * *